United States Patent
Wang et al.

(10) Patent No.: US 10,782,418 B1
(45) Date of Patent: Sep. 22, 2020

(54) CALCULATION METHOD FOR VISUAL NAVIGATION INTEGRITY MONITORING

(71) Applicant: Beihang University, Beijing (CN)

(72) Inventors: Zhipeng Wang, Beijing (CN); Yanbo Zhu, Beijing (CN); Cong Du, Beijing (CN); Kun Fang, Beijing (CN); Qiang Li, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/713,288

(22) Filed: Dec. 13, 2019

(30) Foreign Application Priority Data

Nov. 28, 2019 (CN) .......................... 2019 1 1189662

(51) Int. Cl.
*G01S 19/48* (2010.01)
*G08G 5/02* (2006.01)
*G08G 5/00* (2006.01)

(52) U.S. Cl.
CPC ............ *G01S 19/48* (2013.01); *G08G 5/0047* (2013.01); *G08G 5/0073* (2013.01); *G08G 5/025* (2013.01)

(58) Field of Classification Search
CPC .......... G01S 19/48; G01S 19/13; G01S 19/14; G01S 19/15; G01S 19/17; G01S 19/18; G01S 19/20; G01S 19/01; G01S 19/23; G01S 19/235; G01S 19/25; G01S 19/252; G01S 19/40; G01S 19/42; G01S 19/421; G01S 19/423; G01S 19/425; G01S 19/426; G01S 19/45; G01S 19/51; G01S 2205/003; G08G 5/0047; G08G 5/0073; G08G 5/025; G01C 21/005; G01C 21/30; G01C 21/28; G01C 21/3476; B64C 2201/187
USPC .......................................................... 701/16
See application file for complete search history.

(56) References Cited

U.S. PATENT DOCUMENTS

| | | | |
|---|---|---|---|
| 2005/0125142 A1* | 6/2005 | Yamane | G01C 21/005 701/510 |
| 2012/0146851 A1* | 6/2012 | Fernandez | G01S 19/02 342/357.58 |
| 2014/0070988 A1* | 3/2014 | Peck | G01S 19/20 342/357.24 |
| 2015/0051827 A1* | 2/2015 | Persson | G01C 21/30 701/446 |
| 2015/0268047 A1* | 9/2015 | Morin | G01S 19/252 701/480 |
| 2016/0093225 A1* | 3/2016 | Williams | G01C 21/00 701/17 |
| 2016/0327653 A1* | 11/2016 | Humphreys | G01S 19/48 |
| 2018/0299562 A1* | 10/2018 | Green | G01S 19/44 |

(Continued)

*Primary Examiner* — Nicholas K Wiltey
*Assistant Examiner* — Terry C Buse
(74) *Attorney, Agent, or Firm* — Locke Lord LLP; Tim Tingkang Xia, Esq.

(57) ABSTRACT

The present invention provides a calculation method for visual navigation integrity monitoring. With the method, by use of an appropriate visual positioning model, a mathematical algorithm and rich navigation measurements, the positioning accuracy and availability of positioning results are improved, and the problem of insufficient performance of satellite integrity algorithms caused by impossible guarantee of availability of a GNSS in complex environments is solved, which is helpful to realize aircraft accurate approach and automatic landing and of great significance to ensure the safety of aviation flight.

9 Claims, 3 Drawing Sheets

(56) References Cited

U.S. PATENT DOCUMENTS

2018/0340788 A1\* 11/2018 Liu .................. G01C 21/28
2019/0113629 A1\* 4/2019 Kang ................ G01S 19/06

\* cited by examiner

CALCULATION METHOD FOR VISUAL NAVIGATION INTEGRITY MONITORING

CROSS-REFERENCE TO RELATED PATENT APPLICATION

This non-provisional application claims priority to and the benefit of, pursuant to 35 U.S.C. § 119(a), patent application Serial No. CN201911189662.7 filed in China on Nov. 28, 2019. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

TECHNICAL FIELD

The present invention relates to the field of satellite navigation technologies, and in particular, to a calculation method for visual navigation integrity monitoring.

BACKGROUND

With the development and wide application of satellite navigation technologies, people have increasingly realized the importance of a global satellite navigation system in the aspect of integrity. An investigation report shows that in aviation applications, most fatal accidents occur in the final approach and landing stages, so although the approach and landing stages of a flight are the shortest, they are also the most critical part to ensure life safety.

Autonomous integrity monitoring of a global positioning system (GPS) receiver provides the integrity of a navigation system by checking the consistency of satellite positioning observations. However, in the approach and landing stages of flight paths, due to inadequate satellite positioning observations, the performance of existing receiver autonomous integrity monitoring methods generally cannot meet the requirements of integrity and availability for stringent aviation applications. Therefore, the development of visual navigation devices to assist a global navigation satellite system has become a hotspot in the field of aviation satellite navigation.

At present, some universities and research institutes such as Beijing university of Aeronautics and Astronautics and Xi'an Navigation Technology Research Institute have conducted theoretical and technical research on the integrity of satellite navigation. From GPS to differential GPS, and then to other navigation systems, such as inertial navigation systems and integrated navigation systems, more and more researches have been conducted on the integrity of satellite navigation. Meanwhile, satellite positioning integrity monitoring methods have been relatively mature, but the permanent availability of satellite positioning signals cannot be guaranteed under all environments or operating conditions, resulting in insufficient performance of satellite integrity algorithms. Therefore, a research method for monitoring the integrity of a visual aided navigation system is proposed in the present invention.

SUMMARY

To solve the problem of insufficient performance of satellite integrity algorithms caused by impossible guarantee of permanent availability of satellite positioning under complex environments or operating conditions in the prior art, a calculation method for visual navigation integrity monitoring is provided in the present invention, which includes:

(1) establishing an appropriate visual positioning model according to a specific visual positioning scenario, and calculating a visual positioning solution;

(2) correcting an error of a visual system parameter, and calculating an error state vector;

(3) establishing a visual observation model, and calculating a visual system observation matrix H;

(4) introducing a visual fault deviation, and analyzing the variation of a fault deviation vector b on visual observations;

(5) calculating a combined navigation positioning equation by combining a visual system observation equation and a satellite positioning equation; and (6) calculating protection levels in different fault modes.

Further, the visual positioning model in step (1) can be divided into two categories in the specific visual positioning scenario, wherein the first category uses a manually set ground sign as a landing reference, and the second category uses an airport runway as a landing reference;

the manually set ground sign is an "H" or "I" sign; and using an airport runway as a landing reference is borrowing an airport runway contour line in the vicinity of an airport environment so that a camera can reliably identify an airport runway target.

Further, the following visual positioning equation is constructed in a navigation coordinate system:

$$t_m^n = s_m^n + p^n + q^n$$

the position $p^n = [x_3 \ y_3 \ z_3]^T$ of an aircraft in a three-dimensional world can be calculated to position the aircraft when a line-of-sight vector $s_m^c$ of a landmark under the camera and the position $q^b = [x_1 \ y_2 \ z_3]^T$ of the camera in a body coordinate system and a position vector to $t_m^n = [x_2 \ y_2 \ z_2]^T$ of a landing landmark are known, where $t_m^n$ denotes a position vector of the $m^{th}$ landmark point in the navigation coordinate system, $s_m^n$, denotes a line-of-sight vector of the $m^{th}$ target in the navigation coordinate system, $p^n$ denotes an aircraft position vector in the navigation coordinate system, $q^n$ denotes a distance from the center of light of the camera to the center of mass of the aircraft body, also referred to as a minimum angle offset vector between the camera and the aircraft body, and $q^b$ denotes the position of the camera in the body coordinate system, which can be calibrated by the camera.

Further, the step of correcting an error of a visual system parameter, and calculating an error state vector is specifically as follows:

expressing the error state vector having errors based on previously described mathematical parameters as:

$$\delta x = [\beta p^n \ \delta t_m^n]$$

where $\delta p^n$ is a three-dimensional error vector of an aircraft position vector: $\delta p^n = \tilde{p}^n - p^n$, and $\delta t_m^n$ is a landmark position error: $\delta t_m^n = \tilde{t}_m^n - t_m^n$, wherein the nominal value is denoted by a tilde;

the number of landmarks actually varies over time as a landing landmark enters and leaves the field of view of the camera, but there must be a reasonable maximum number of landmarks tracked at any given time to maintain the calculation efficiency.

Further, the step of calculating a visual system observation matrix His specifically as follows:

expressing a visual observation equation of the mg' landmark as:

$$z_m(t_i) = T_c^{pix} \underline{s}_m^c(t_i) + v(t_i)$$

where the vector $z_m(t_i)$ is a pixel position of a landing landmark point m, $T_c^{pix}$ is a transformation matrix between a pixel coordinate system and a camera coordinate system, $s_m^c$ denotes that the pixel position corresponds to the line-of-sight vector extending outward from the camera focus, $s_{m_z}^c$ is a distance of the camera in the direction $s_z$ from the optical center, $\underline{s}_m^c(t_i)$ is a normalized form of the line-of-sight vector from the camera to the target m, and $v(t_i)$ is an independent additive Gaussian white noise with a mean of zero and a covariance of R, which satisfies the following relation:

$$E[v(t_i)v^t(t_j)] = \begin{cases} R, & t_i = t_j \\ 0, & t_i \neq t_j \end{cases}$$

assuming that in a rectangular (M*N) pixel grid with a height H and a width W, a transformation relation between the pixel coordinate system and the camera coordinate system is $T_c^{pix}$, $T_{pix}^c$ is known, and the relation between $T_c^{pix}$ and $T_{pix}^c$ is as follows:

$$T_{pix}^c = \begin{bmatrix} -\dfrac{H}{fM} & 0 & \dfrac{H(M+1)}{2fM} \\ 0 & \dfrac{W}{fN} & -\dfrac{W(N+1)}{2fN} \\ 0 & 0 & 1 \end{bmatrix} = (T_c^{pix})^{-1}$$

a nonlinear equation $z_m(t_i) = T_c^{pix} \underline{s}_m^c(t_i) + v(t_i)$ is linearized, a nonlinear function is set to $h[x(t_i)] = T_c^{pix} \underline{s}_m^c(t_i)$, a first-order Taylor expansion is calculated, and the visual system observation matrix H can be obtained, wherein the following expression is given by partial derivatives of elements in the visual system observation matrix H obtained by the following equation:

$$H = \begin{bmatrix} \dfrac{\partial h}{\partial p^n} & 0 \end{bmatrix}$$

because $$q^n = C_b^n C_c^b s_m^c + C_b^n q^d = C_b^n (C_c^b s_m^c + q^d)$$

a partial derivative of h with respect to $p^n$ is as follows:

$$\frac{\partial h}{\partial p^n} = \frac{1}{s_{m_z}^c} T_c^{pix}(s_m^c C_n^b C_b^c - C_n^b C_b^c)$$

and because the visual system observation matrix H is irrelevant to $t_m^n$, the partial derivative of H with respect to $\delta t_m^n$ is zero.

Further, the process of analyzing the variation of a fault deviation vector b on a visual observation vector z is as follows:

a linearized visual observation model of the state vector x being expressed as follows:

$$z = Hx + v + b$$

where z is the visual observation vector, and the state vector x is an n-dimensional column vector; v is an m-dimensional observation noise vector subject to Gaussian noise from a zero mean, and its covariance matrix is a diagonal matrix R, expressed as $R = \sigma^2 I_{m*m}$; b is an m-dimensional fault bias vector, under the condition of no fault, b is a zero vector, but when a single fault occurs in the $i^{th}$ measurement quantity, the $i^{th}$ element in b is still expressed as b;

when the visual observation vector varies, the visual observation error $\delta z$ is expressed as: $\delta z = H \delta x$;

therefore, the least square solution of $z = Hx + v + b$ is obtained as:

$$\delta x = (H^T H)^{-1} H^T \delta z$$

if a noise vector is not taken into account, the following equation can be obtained from the linear observation model of the state vector x:

$$\delta x = \hat{x} - x = \overline{H}z = \overline{H}b$$

where $\overline{H} = (H^T H)^{-1} H^T$ because the fault deviation vector b has an influence on each component x and y of a pixel point (x, y), the fault deviation vector b is expressed in polar coordinates as: $b_i = \|b\|\cos\theta$, $b_j = \|b\|\sin\theta$; then $b_i = \|b\|\cos\theta$ is the influence of the fault deviation vector b on the component x, $b_j = \|b\|\sin\theta$ is the influence of the fault deviation vector b on the component y; therefore, the norm of the position error is: $\|\delta x\|^2 = (\overline{H}b)^T \overline{H}b$;

because $$(\overline{H}b)^T \overline{H}b = b^T \overline{H}^T \overline{H} b = b_i b_i (\overline{H}^T \overline{H})_{ii} + b_i b_j (\overline{H}^T \overline{H})_{ij} + b_i b_j (\overline{H}^T \overline{H})_{ji} + b_j b_j (\overline{H}^T \overline{H})_{jj}$$

by substituting it into the polar coordinate formula, the influence formula of the fault deviation vector b on a horizontal position error can be obtained as follows:

$$\delta x = \left(\|b\|^2 \left(\sin 2\theta (\overline{H}^T \overline{H})_{ii} + \sin 2\theta (\overline{H}^T \overline{H})_{ij} + \cos^2\theta (\overline{H}^T \overline{H})_{jj}\right)\right)^{\frac{1}{2}}$$

therefore, when the angle value $\theta$ changes, the horizontal position error will also change correspondingly, especially when some special angle values are taken for $\theta$, the formula of horizontal position error $\delta x$ can be simplified.

Further, the process of calculating a combined navigation positioning equation is:

assuming that the satellite positioning equation is $z = Gx$, and combining the visual system observation matrix H with a satellite observation matrix G to obtain a new combined extended observation matrix H', which is expressed as follows:

$$H' = \begin{bmatrix} H \\ G \end{bmatrix},$$

H' is a m-n linear observation matrix, when a limited number of satellites are still available, the limited number of satellite observations can be utilized to enhance a visual navigation device;

if the visual system is a binocular visual system composed of two cameras or a system composed of three cameras, transformation matrixes $M_1$, $M_2$, and $M_i$ of a single camera sensor in the visual system can be combined into M, and M can be expressed as:

$$M = \begin{pmatrix} M_1 & 0 & 0 \\ 0 & M_2 & 0 \\ 0 & 0 & M_i \end{pmatrix}$$

Further, the calculation method of the protection levels is divided into three hypotheses: a hypothesis 1, a hypothesis 2, and a hypothesis 3; and the hypothesis 1 is the case where there is no fault in the observations; the hypothesis 2 is the case where a single fault occurs in the observations; the hypothesis 3 is the case wherein two faults occur in the observations.

Further, in the case of the hypothesis 1, the protection level can be calculated according to a fault-free pickup factor $K_{ff}$ and a horizontal position standard deviation wherein the fault-free pickup factor $K_{ff}$ is determined by a fault-free probability $P_{ff}$; therefore, a calculation formula of a fault-free protection level is expressed as:

$$HPL_1 = K_{ff}(k) * \sigma_x$$

where $K_{ff}$ is the fault-free pickup factor, and $\sigma_x$ is the standard deviation in an aircraft horizontal direction;

in the case of the hypothesis 2, it is possible for a single visual observation to fail or a single satellite positioning observation to fail;

when only a single observation fails, only one deviation component is included in the fault deviation vector b, and the horizontal position error $\delta x$ now can be expressed as follows:

$$\delta x = \hat{x} - x = \overline{H} z = \overline{H} b$$

where $\hat{x}$ denotes the least square estimation value, $H = (H^T H)^{-1} H^T$;

the slope of each observation is set to Hslope, expressed as follows:

$$Hslope_i = \frac{\delta x^2}{D} = \frac{\|\delta x\|^2}{\|p\|^2} = \frac{\delta x^T \delta x}{p^T p} = \frac{b^T \overline{H}^T \overline{H} b}{b^T P^T P b}$$

wherein $b^T \overline{H}^T \overline{H} b = b_i b_i (\overline{H}^T \overline{H})_{ii} + b_i b_j (\overline{H}^T \overline{H})_{ij} + b_i b_j (\overline{H}^T \overline{H})_{ji} + b_j b_j (\overline{H}^T \overline{H})_{jj}$ where D is test statistics, p denotes a parity vector, P denotes a parity transformation matrix, p=Pb; therefore, the horizontal positioning error protection level $HPL_2$ is:

$$HPL_2 = Hslope_{max} \times s_{bias}$$

where $$s_{bias} = \sigma \frac{\sqrt{\lambda}}{\sqrt{n-4}},$$

$\sigma$ is a noise variance, $\lambda$ is a decentralized parameter, and the value of $HPL_2$ is minimum when there is no fault, and when a single fault occurs in the observations, the value of $HPL_2$ will increase;

in the case of the hypothesis 3, it is possible for two visual observations to fail, two satellite positioning observations to fail or one visual observation and one satellite positioning observation to fail;

when two observations fail, fault deviation vectors of simultaneous failing of the $i^{th}$ observation and the $j^{th}$ observation are $b^{(i)}$ and $b^{(j)}$, which can be expressed as:

$$b = [0 \ldots 0 \; b^{(i)} \; b^{(j)} 0 \ldots 0 \; 0 \ldots 0]^T$$

therefore, the positioning error is expressed as follows:

$$\Delta = \overline{H} b = Ab = [b^{(i)} A_{1i} + b^{(j)} A_{1j} \; b^{(i)} A_{2i} + b^{(j)} A_{2i} \; b^{(i)} A_{3i} + b^{(j)} A_{3i} \; b^{(i)} A_{4i} + b^{(j)} A_{4j}]^T$$

the horizontal positioning error is expressed as follows:

$$\delta x^2 = (b^{(i)} A_{1i} + b^{(j)} A_{1j})^2 + (b^{(i)} A_{2i} + b^{(j)} A_{2j})^2$$

therefore, the formula for calculating the slope Hslope is:

$$Hslope_i = \frac{\delta x^2}{D} = \frac{\|\delta x\|^2}{\|p\|^2} = \frac{\delta x^T \delta x}{p^T p} = \frac{(b^{(i)} A_{1i} + b^{(j)} A_{1j})^2 + (b^{(i)} A_{2i} + b^{(j)} A_{2j})^2}{b^T P^T P b}$$

therefore, the formula for calculating $HPL_3$ is:

$$HPL_3 = Hslope_{max} \times s_{bias}$$

by combining the hypothesis 1, the hypothesis 2, and the hypothesis 3, errors in all cases are enveloped in the protection levels, and a formula for calculating a total protection level is obtained as follows:

$$HPL = \sqrt{\max(HPL_1, HPL_2)^2 + HPL_3^2}.$$

Further, the visual measurement equation $z_m(t_i) = T_c^{pix} \underline{s}_m^c(t_i) + v(t_i)$ of the $m^{th}$ landmark is also referred to as a pseudo-distance positioning equation.

Compared with the prior art, the present invention has the following beneficial effects.

The present invention provides a calculation method for visual navigation integrity monitoring. With the method, an appropriate visual positioning measurement model and a mathematical algorithm are proposed for different actual situations, which enriches navigation observations, improves the positioning accuracy and the performance of integrity monitoring, and solves the disadvantage of insufficient performance of satellite integrity algorithms caused by impossible guarantee of availability of satellite positioning in complex environments or situations in the prior art.

BRIEF DESCRIPTION OF DRAWINGS

To make the contents of the present invention more easily understood, the present invention is described below in further detail with reference to specific embodiments of the present invention and the accompanying drawings, in which.

DETAILED DESCRIPTION

Figure 1:
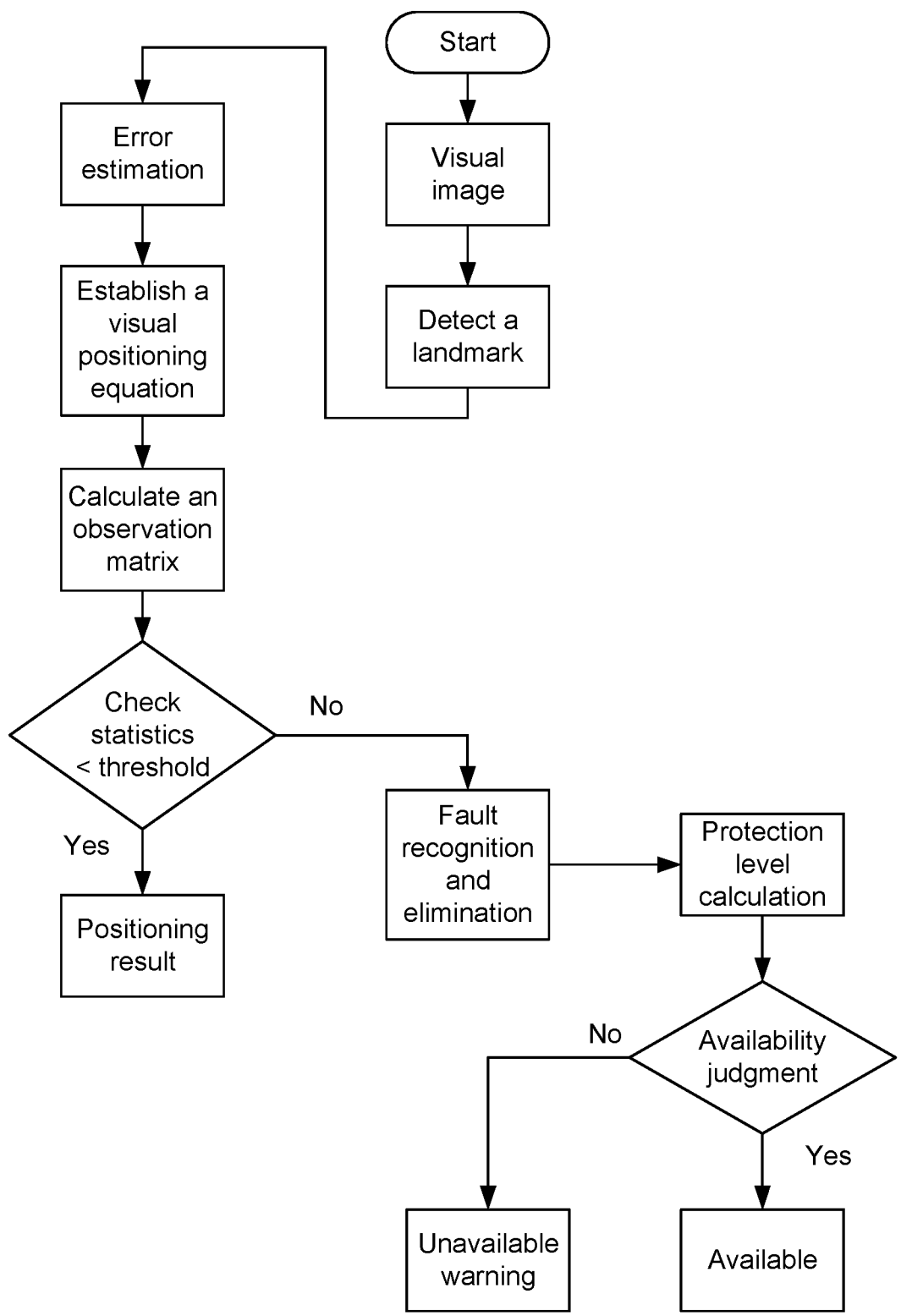
FIG. 1 is a flowchart of visual integrity monitoring in this embodiment.

The objectives and functions of the present invention and the methods for achieving these objectives and functions will be clarified with reference to exemplary embodiments. However, the present invention is not limited to the following disclosed exemplary embodiments. It can be implemented in different forms. The essence of the specification is merely to help those skilled in the art to comprehensively understand specific details of the present invention.

Embodiments of the present invention will be described below with reference to the accompanying drawings. In the drawings, identical reference numerals represent identical or similar parts, or identical or similar steps. A calculation method for visual navigation integrity monitoring according to the present invention are described below through specific embodiments.

In this method, visual observations of a visual navigation landing system are introduced to improve the performance of navigation integrity monitoring. Referring to FIG. 1, it is a flowchart of visual integrity monitoring in this embodiment. First of all, image preprocessing is performed according to images captured by a camera, and images with a landing landmark are detected and retained for use in the positioning of a visual system. Secondly, in order to ensure the positioning accuracy and reduce errors caused by system parameters, the errors need to be modified and estimated. Then, a visual observation model is obtained by constructing a visual positioning equation, and an observation matrix is calculated to further calculate position and attitude information of an aircraft. Finally, fault detection and elimination are carried out, and when test statistics is less than a threshold, no fault occurs in the system, a positioning result can be directly output. Otherwise, when the test statistics is greater than or equal to the threshold, a fault occurs in the system, the fault can be eliminated, and then protection levels in the case of different faults can be calculated respectively to further judge availability of the system.

The method includes the following specific steps.

(1) Establish an appropriate visual positioning model according to a specific visual positioning scenario, and calculate a visual positioning solution.

Figure 2:
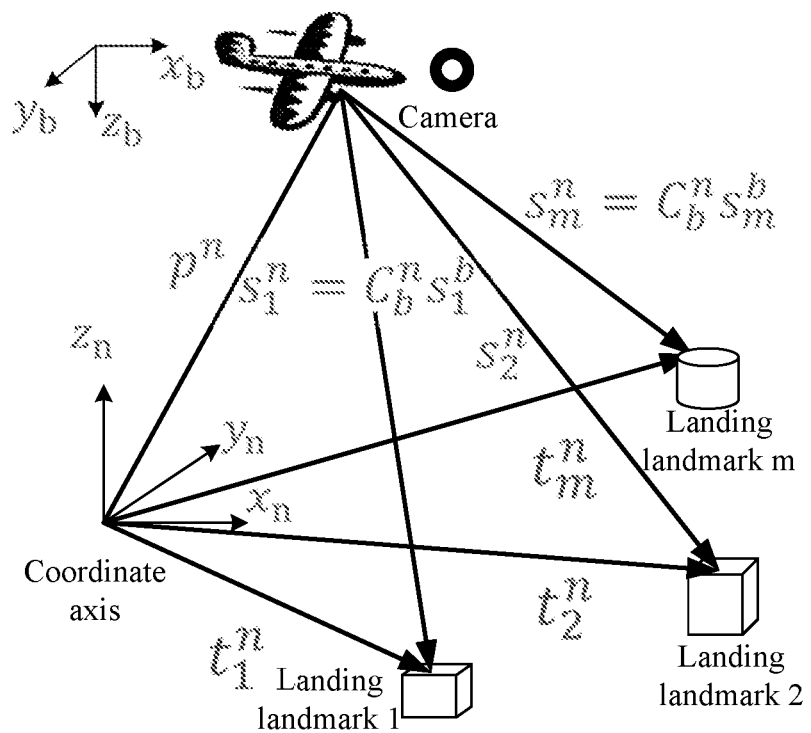
FIG. 2 shows a positioning model of an artificial target in this embodiment.
Figure 3:
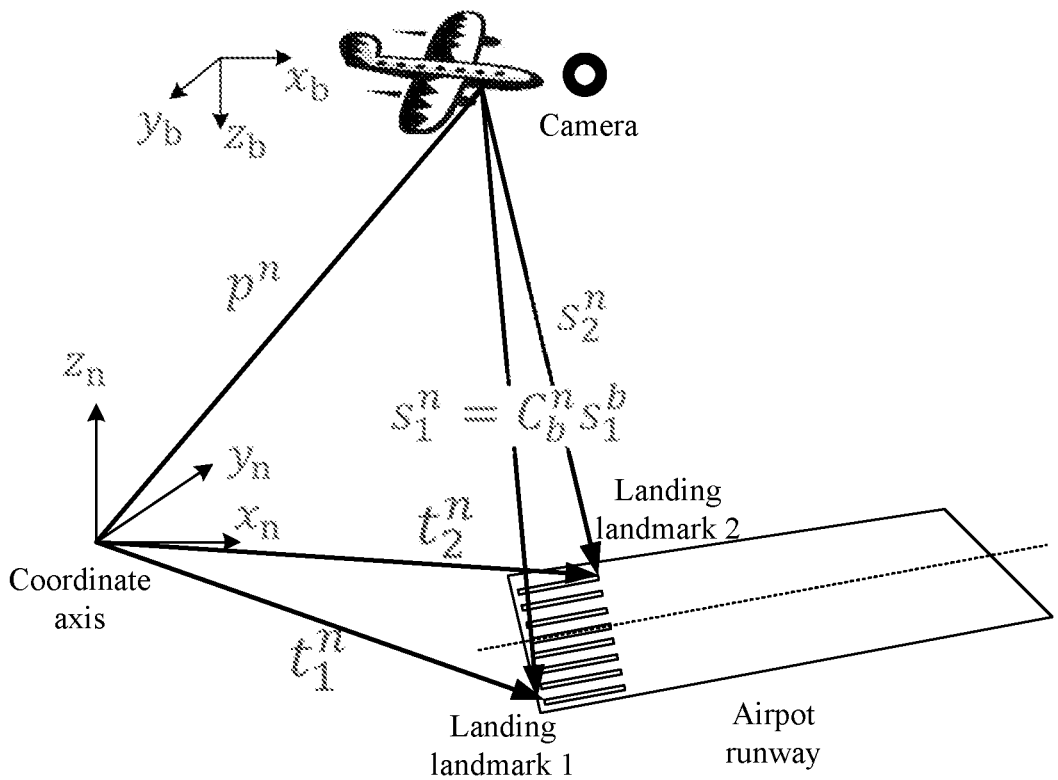
FIG. 3 shows a positioning model of an airport runway in this embodiment.
Figure 4:
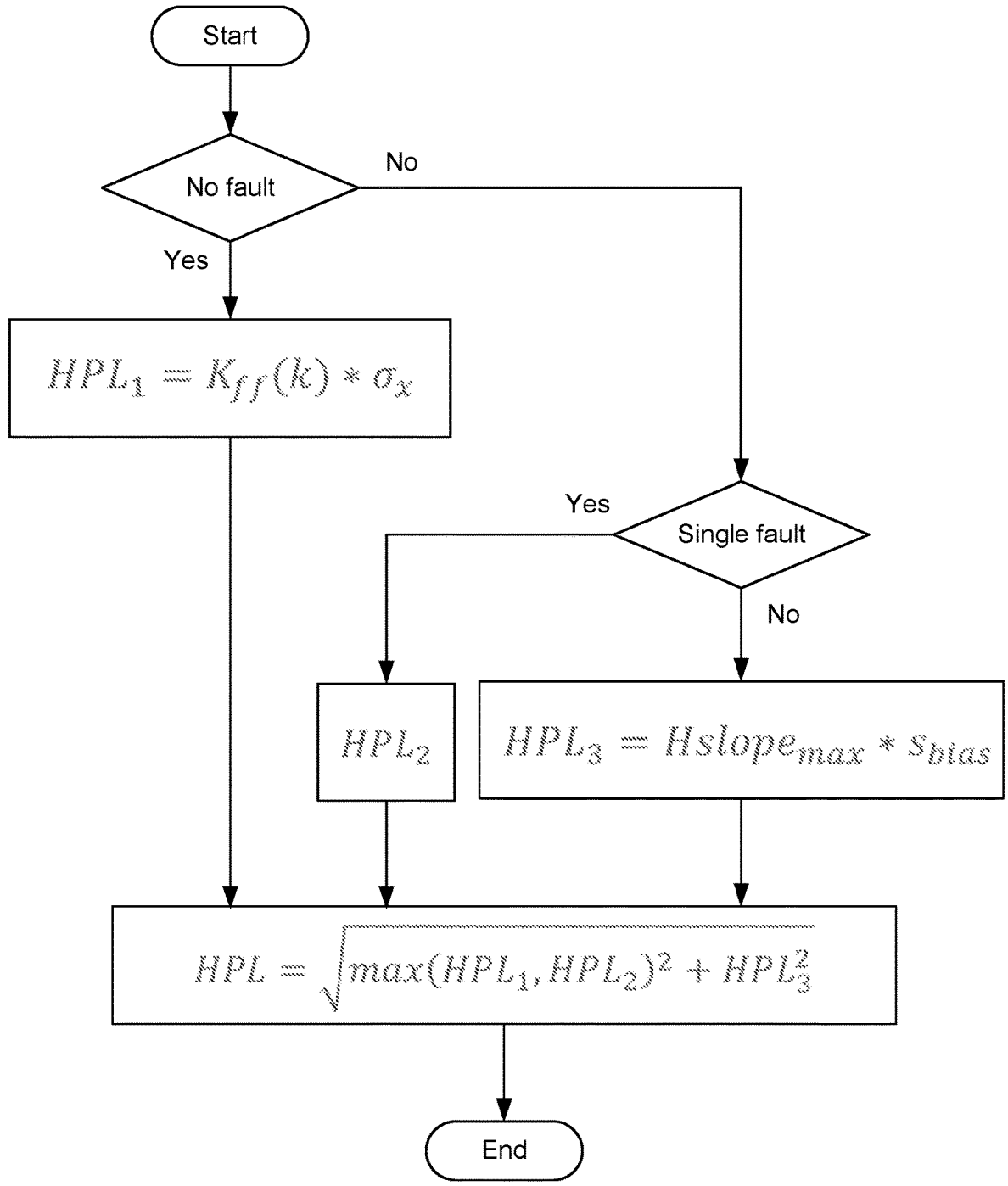
FIG. 4 is a flowchart of calculation of protection levels in this embodiment.

Through the study on aircraft visual landing scenarios, the visual positioning model can be summarized into two scenarios: in the first scenario, an artificial target with distinct characteristics is used as a landing sign, for example, an "H" or "I" sign, as shown in FIG. 2; in the second scenario, an airport runway contour line in the vicinity of an airport environment is borrowed so that a camera can reliably identify an airport runway target, as shown in FIG. 3.

As shown in FIG. 2 and FIG. 3, in a navigation coordinate system, according to the addition of vectors, an aircraft position vector $p^n$, a small angle offset vector between the camera and the aircraft body $q^n$ and a line-of-sight vector $s_m^n$ are added to obtain a landing landmark vector $t_m^n$, and the following equation is established:

$$t_m^n = s_m^n + p^n + q^n$$

Therefore, the position $p^n = [x_3 \ y_3 \ z_3]^T$ of an aircraft in a three-dimensional world can be calculated to position the aircraft when the line-of-sight vector $s_m^c$ of the landmark under the camera and the position $q^b = [x_1 \ y_1 \ z_1]^T$ of the camera in a body coordinate system and a position vector $t_m^n = [x_2 \ y_2 \ z_2]^T$ of a landing landmark are known, where $p^n$ denotes an aircraft position vector in the navigation coordinate system;

$t_m^n$ denotes a position vector of the $m^{th}$ landmark point in the navigation coordinate system;

$C_b^n$ denotes a direction cosine matrix of the transformation from the body coordinate system to the navigation coordinate system;

$s_m^n$ denotes a line-of-sight vector of the $m^{th}$ target in the navigation coordinate system;

$s_m^b$ denotes a line-of-sight vector of the $m^{th}$ target in the body coordinate system, $s_m^n = C_b^n s_m^b$ $q^n$ denotes a distance from the center of light of the camera to the center of mass of the aircraft body; and $q^b$ denotes the position of the camera in the body coordinate system, which can be calibrated by the camera.

(2) Correct an error of a visual system parameter, and calculating an error state vector.

Since system parameters are prone to errors, it is necessary to estimate and correct errors of visual parameters in order to reduce the impact of linearization errors in the calculation of visual observations.

The error state vector having errors based on previously described mathematical parameters can be expressed as:

$$\delta x = [\delta p^n \ \delta t_m^n]$$

where $\delta p^n$ is a three-dimensional error vector of an aircraft position vector, which can be expressed as:

$$\delta p^n = \tilde{p}^n - p^n$$

$\delta t_m^n$ is a landmark position error, which can be expressed as:

$$\delta t_m^n = \tilde{t}_m^n - t_m^n$$

wherein the nominal value is denoted by a tilde.

It should be noted that the number of landmarks actually varies over time as a landing landmark enters and leaves the field of view of the camera, but there must be a reasonable maximum number of landmarks tracked at any given time to maintain the calculation efficiency.

(3) Establish a visual observation model, and calculating a visual system observation matrix H.

As shown in FIG. 2, a visual observation equation of the $m^{th}$ landmark is expressed as:

$$z_m(t_i) = T_c^{pix} s_m^c(t_i) + v(t_i)$$

the formula is also referred to as a pseudo-distance positioning equation, and is obtained based on a landing landmark point and a pixel in the corresponding image.

where the vector $z_m(t_i)$ is a pixel position of a landing landmark point m;

$T_c^{pix}$ is a transformation matrix between a pixel coordinate system and a camera coordinate system;

$s_m^c$ denotes that the pixel position corresponds to the line-of-sight vector extending outward from the camera focus;

$s_{m_z}^c$ is a distance of the camera in the direction $s_z$ from the optical center;

$\underline{s}_m^c(t_i)$ is a normalized form of the line-of-sight vector from the camera to the target m; and $v(t_i)$ is an independent additive Gaussian white noise with a mean of zero and a covariance of R, which satisfies the following equation:

$$E[v(t_i)v^t(t_j)] = \begin{cases} R, & t_i = t_j \\ 0, & t_i \neq t_j \end{cases}$$

$T_{pix}^c$ is known, assuming that in a rectangular (M*N) pixel grid with a height H and a width W, a transformation relation between the pixel coordinate system and the camera coordinate system is $T_c^{pix}$, the following formula is satisfied:

$$T_{pix}^c = \begin{bmatrix} -\dfrac{H}{fM} & 0 & \dfrac{H(M+1)}{2fM} \\ 0 & \dfrac{W}{fN} & -\dfrac{W(N+1)}{2fN} \\ 0 & 0 & 1 \end{bmatrix} = (T_c^{pix})^{-1}$$

To facilitate the calculation, a nonlinear equation $z_m(t_i) = T_c^{pix} \underline{s}_m^c(t_i) + v(t_i)$ is linearized, a nonlinear function is set to $h[x(t_i)] = T_c^{pix} \underline{s}_m^c(t_i)$, a first-order Taylor series expansion is calculated, and the visual system observation matrix H can be obtained, wherein elements in H are given by partial derivatives calculated by the following equation:

$$H = \begin{bmatrix} \dfrac{\partial h}{\partial p^n} & 0 \end{bmatrix}$$

because $$q^n = C_b^n C_c^b s_m^c + C_b^n q^d = C_b^n (C_c^b s_m^c + q^d)$$

a partial derivative of h with respect to $p^n$ is:

$$\dfrac{\partial h}{\partial p^n} = \dfrac{1}{s_{m_z}^c} T_c^{pix}(s_m^c C_n^b C_b^c - C_n^b C_b^c)$$

and because H is irrelevant to $t_m^n$, the partial derivative of H with respect to $\delta t_m^n$ is zero.

(4) Introduce a visual fault deviation, and analyze the variation of a fault deviation vector b on visual observations.

A linearized visual observation model of the state vector x being expressed as the following formula:

$$z = Hx + v + b$$

where z is the visual observation vector, and the state vector x is an n-dimensional column vector; v is an m-dimensional observation noise vector subject to Gaussian noise from a zero mean, and its covariance matrix is a diagonal matrix R, expressed as $R = \sigma^2 I_{m*m}$; b is an m-dimensional fault bias vector, under the condition of no fault, b is a zero vector, but when a single fault occurs in the $i^{th}$ measurement quantity, the $i^{th}$ element in b is still expressed as b;

when the visual observation vector varies, the visual observation error is expressed as:

$$\delta z = H \delta x$$

therefore, the least square solution of $z = Hx + v + b$ is obtained as:

$$\delta x = (H^T H)^{-1} H^T \delta z$$

if a noise vector is not taken into account, the following equation can be obtained from the linear observation model of the state vector x:

$$\delta x = \hat{x} - x = \overline{H} z = \overline{H} b$$

where $\overline{H} = (H^T H)^{-1} H^T$;

because the fault deviation vector b has an influence on each component x and y of a pixel point (x, y), the fault deviation vector b is expressed in polar coordinates as:

$$b_i = \|b\| \cos \theta$$

$$b_j = \|b\| \sin \theta$$

$b_i = \|b\| \cos \theta$ is the influence of the fault deviation vector b on the component x; and $b_j = \|b\| \sin \theta$ is the influence of the fault deviation vector b on the component y.

Therefore, the norm of the position error is expressed by the following formula:

$$\|\delta x\|^2 = (\overline{H} b)^T \overline{H} b;$$

according to the following formula:

$$(\overline{H}b)^T \overline{H} b = b^T \overline{H}^T \overline{H} b = b_i b_i (\overline{H}^T \overline{H})_{ii} + b_i b_j (\overline{H}^T \overline{H})_{ij} + b_i b_j (H^T H)_{ji} + b_j b_j (\overline{H}^T \overline{H})_{jj}$$

by substituting it into the polar coordinate formula, the influence formula of the fault deviation vector b on a horizontal position error can be obtained, and a specific formula is as follows:

$$\delta x = \left( \|b\|^2 \left( \sin^2 \theta (\overline{H}^T \overline{H})_{ii} + \sin 2\theta (\overline{H}^T \overline{H})_{ij} + \cos^2 \theta (\overline{H}^T \overline{H})_{jj} \right) \right)^{\frac{1}{2}}$$

therefore, when the angle value $\theta$ changes, the horizontal position error will also change correspondingly, especially when some special angle values are taken for $\theta$, the formula of horizontal position error $\delta x$ can be simplified.

(5) Calculate a combined navigation positioning equation by combining a visual system observation equation and a satellite positioning equation.

assuming that the satellite positioning equation is $z = Gx$, the visual system observation matrix H is combined with a satellite observation matrix G to obtain a new combined extended observation matrix H', which is expressed as follows:

$$H' = \begin{bmatrix} H \\ G \end{bmatrix},$$

H' is a m*n linear observation matrix, when a limited number of satellites are still available, the limited number of satellite observations can be utilized to enhance a visual navigation device;

if the visual system is a binocular visual system composed of two cameras or a system composed of three cameras, transformation matrixes $M_1$, $M_2$, and $M_i$ of a single camera sensor in the visual system can be combined into M, and M can be specifically expressed as:

$$M = \begin{pmatrix} M_1 & 0 & 0 \\ 0 & M_2 & 0 \\ 0 & 0 & M_i \end{pmatrix}$$

(6) Calculate protection levels in different fault modes.

The calculation method of the protection levels is divided into three hypotheses: a hypothesis 1, a hypothesis 2, and a hypothesis 3.

The hypothesis 1 is the case where there is no fault in the observations, in which case the protection level can be calculated according to a fault-free pickup factor $K_{ff}$ and a horizontal position standard deviation $\sigma_x$, wherein the fault-free pickup factor $K_{ff}$ is determined by a fault-free probability $P_{ff}$; therefore, a calculation formula of a fault-free protection level is expressed as:

$$HPL_1 = K_{ff}(k) * \sigma_x$$

where $HPL_1$ denotes the fault-free protection level; $K_{ff}$ is the fault-free pickup factor, and $\sigma_x$ is the standard deviation in an aircraft horizontal direction.

The hypothesis 2 is the case where a single fault occurs in the observations, in which case it is possible for a single visual observation to fail or a single GNSS observation to fail.

When only a single observation fails, only one deviation component is included in the fault deviation vector b, and the horizontal position error δx now can be expressed as follows:

$$\delta x = \hat{x} - x = \overline{H}z = \overline{H}b$$

where $\hat{x}$ denotes the least square estimation value, $\overline{H} = (H^T H)^{-1} H^T$;

the slope of each observation is set to Hslope, expressed as follows:

$$Hslope_i = \frac{\delta x^2}{D} = \frac{\|\delta x\|^2}{\|p\|^2} = \frac{\delta x^T \delta x}{p^T p} = \frac{b^T \overline{H}^T \overline{H} b}{b^T P^T P b}$$

wherein $b^T \overline{H}^T \overline{H} b = b_i b_i (\overline{H}^T \overline{H})_{ii} + b_i b_j (\overline{H}^T \overline{H})_{ij} + b_i b_j (\overline{H}^T \overline{H})_{ji} + b_j b_j (\overline{H}^T \overline{H})_{jj}$ where D is test statistics, p denotes a parity vector, P denotes a parity transformation matrix, p=Pb; therefore, the horizontal positioning error protection level $HPL_2$ is:

$$HPL_2 = Hslope_{max} \times s_{bias}$$

where $$s_{bias} = \sigma \frac{\sqrt{\lambda}}{\sqrt{n-4}},$$

σ is a noise variance, is a decentralized parameter, and the value of $HPL_2$ is minimum when there is no fault, and when a single fault occurs in the observations, the value of $HPL_2$ will increase.

The hypothesis 3 is the case wherein two faults occur in the observations, in which case it is possible for two visual observations to fail, two GNSS observations to fail or one visual observation and one GNSS observation to fail.

When two observations fail, fault deviation vectors of simultaneous failing of the $i^{th}$ observation and the $i^{th}$ observation are $b^{(i)}$ and $b^{(j)}$, which can be expressed as:

$$b = [0 \ldots 0 \ b^{(i)} \ b^{(j)} 0 \ldots 0 \ 0 \ldots 0]^T$$

therefore, the positioning error is expressed as follows:

$$\Delta = \overline{H}b = Ab = [b^{(i)}A_{1i} + b^{(j)}A_{1j} \ b^{(i)}A_{2i} + b^{(j)}A_{2j} \ b^{(i)}A_{3i} + b^{(j)}A_{3j} \ b^{(i)}A_{4i} + b^{(j)}A_{4j}]^T$$

the horizontal positioning error is expressed as follows:

$$\delta x^2 = (b^{(i)}A_{1i} + b^{(j)}A_{1j})^2 + (b^{(i)}A_{2i} + b^{(j)}A_{2j})^2$$

therefore, the formula for calculating the slope Hslope is:

$$Hslope_i = \frac{\delta x^2}{D} = \frac{\|\delta x\|^2}{\|p\|^2} = \frac{\delta x^T \delta x}{p^T p} = \frac{(b^{(i)}A_{1i} + b^{(j)}A_{1j})^2 + (b^{(i)}A_{2i} + b^{(j)}A_{2j})^2}{b^T P^T P b}$$

therefore, the formula for calculating $HPL_3$ is:

$$HPL_3 = Hslope_{max} \times s_{bias}$$

by combining the hypothesis 1, the hypothesis 2, and the hypothesis 3, errors in all cases are enveloped in the protection levels, and a formula for calculating a total protection level is obtained as follows:

$$HPL = \sqrt{\max(HPL_1, HPL_2)^2 + HPL_2^3}.$$

In all cases, the more accurate the value of the protection level is, the more a user can be protected against all deviations if a value of risk is given, and the higher the system availability is.

According to this embodiment, faults can be effectively eliminated through the proposed visual navigation integrity monitoring algorithm, thus improving the accuracy and availability of navigation positioning.

The above embodiments are merely examples for clear illustration, instead of a limitation on the implementation manners. Those of ordinary skill in the art can also make other different forms of changes or alternations on the basis of the above description. There is no need and no way to exhaust all the implementation manners. Changes or alterations arising therefrom are still within the protection scope of the present invention.

Other embodiments of the invention are easily thought of and understood by those skilled in the art in combination with the descriptions and practice of the present invention disclosed here. The descriptions and embodiments are only considered to be exemplary and the true scope and subject matter of the present invention are defined by the claims.

What is claimed is:

1. A calculation method for visual navigation integrity monitoring, comprising:
    (1) establishing an appropriate visual positioning model according to a specific visual positioning scenario, and calculating a visual positioning solution;
    (2) calculating an error state vector, and correcting an error of a visual system parameter used in the calculating process of the visual positioning solution;
    (3) establishing a visual observation model, and calculating a visual system observation matrix (H);
    (4) analyzing a variation of a fault deviation vector b on visual observations in the visual observation model;
    (5) calculating a combined navigation positioning equation by combining a visual system observation equation and a satellite positioning equation; and
    (6) calculating protection levels in different fault modes wherein the visual positioning solution is calculated by:
    constructing the following visual positioning equation in a navigation coordinate system:

$$t_m^n = s_m^n + p^n + q^n$$

calculating the position $p^n = [x_3 \ y_3 \ z_3]^T$ of an aircraft in a three-dimensional world to position the aircraft when a line-of-sight vector s of a landmark under a camera and the position $q^b = [x_1 \ y_2 \ z_3]^T$ of the camera in a body coordinate system and a position vector $t_m^n = [x_2 \ y_2 \ z_2]^T$ of a landing landmark are known, where $t_m^n$ denotes a position vector of the $m^{th}$ landmark point in the navigation coordinate system, $s_m^n$ denotes a line-of-sight vector of the $m^{th}$ target in the navigation coordinate system, $p^n$ denotes an aircraft position vector in the navigation coordinate system, $q^n$ denotes a distance from the center of light of the camera to the center of mass of the aircraft body, also referred to as a minimum angle offset vector between the camera and the aircraft body, and $q^b$ denotes the position of the camera in the body coordinate system, which is calibrated by the camera.

2. The calculation method for visual navigation integrity monitoring as described in claim 1, wherein, the visual positioning model in step (1) is divided into two categories in the specific visual positioning scenario, wherein the first category uses a manually set ground sign as a landing reference, and the second category uses an airport runway as the landing reference by borrowing an airport runway contour line within the vicinity of an airport environment so that the camera reliably identifies an airport runway target.

3. The calculation method for visual navigation integrity monitoring as described in claim 1, wherein, the step of calculating the error state vector and correcting the error of the visual system parameter is specifically as follows:

expressing the error state vector having errors based on previously described mathematical parameters as:

$$\delta x = [\beta p^n \; \delta t_m^n]$$

where $\delta p^n$ is a three-dimensional error vector of an aircraft position vector: $\delta p^n = \hat{p}^n - p^n$, and $\delta t_m^n$ is a landmark position error: $\delta t_m^n = \tilde{t}_m^n - t_m^n$, wherein the nominal value is denoted by a tilde; the number of landmarks actually varies over time as a landing landmark enters and leaves the field of view of the camera, but there must be a reasonable maximum number of landmarks tracked at any given time to maintain the calculation efficiency.

4. The calculation method for visual navigation integrity monitoring as described in claim 3, wherein, the visual measurement equation $z_m(t_i) = T_c^{pix} \underline{s}_m^c(t_i) + v(t_i)$ of the $m^{th}$ landmark is also referred to as a pseudo-distance positioning equation.

5. The calculation method for visual navigation integrity monitoring as described in claim 1, wherein, the step of calculating the visual system observation matrix H is specifically as follows: expressing a visual observation equation of the $m^{th}$ landmark as:

$$z_m(t_i) = T_c^{pix} \underline{s}_m^c(t_i) + v(t_i)$$

where the vector $z_m(t_i)$ is a pixel position of a landing landmark point m, $T_c^{pix}$ is a transformation matrix between a pixel coordinate system and a camera coordinate system, $s_m^c$ denotes that the pixel position corresponds to the line-of-sight vector extending outward from the camera focus, $s_{m_z}^c$ is a distance of the camera in the direction $s_z$ from the optical center, $\underline{s}_m^c(t_i)$ is a normalized form of the line-of-sight vector from the camera to the target m, and $v(t_i)$ is an independent additive Gaussian white noise with a mean of zero and a covariance of R, which satisfies the following relation:

$$E[v(t_i)v^t(t_j)] = \begin{cases} R, & t_i = t_j \\ 0, & t_i \neq t_j \end{cases}$$

assuming that in a rectangular (M*N) pixel grid with a height H and a width W, a transformation relation between the pixel coordinate system and the camera coordinate system is $T_c^{pix}$, $T_{pix}^c$ is known, and the relation between $T_c^{pix}$ and $T_{pix}^c$ is as follows:

$$T_{pix}^c = \begin{bmatrix} -\dfrac{H}{fM} & 0 & \dfrac{H(M+1)}{2fM} \\ 0 & \dfrac{W}{fN} & -\dfrac{W(N+1)}{2fN} \\ 0 & 0 & 1 \end{bmatrix} = (T_c^{pix})^{-1}$$

a nonlinear equation $z_m(t_i) = T_c^{pix} \underline{s}_m^c(t_i) + v(t_i)$ is linearized, a nonlinear function is set to $h[x(t_i)] = T_c^{pix} \underline{s}_m^c(t_i)$, a first-order Taylor expansion is calculated, and the visual system observation matrix H is obtained, wherein the following expression is given by partial derivatives of elements in the visual system observation matrix H obtained by the following equation:

$$H = \begin{bmatrix} \dfrac{\partial h}{\partial p^n} & 0 \end{bmatrix}$$

because $$q^n = C_b^n C_c^b s_m^c + C_b^n q^d = C_b^n (C_c^b s_m^c + q^d)$$

a partial derivative of h with respect to $p^n$ is as follows:

$$\dfrac{\partial h}{\partial p^n} = \dfrac{1}{s_{m_z}^c} T_c^{pix} (s_m^c C_n^b C_b^c - C_n^b C_b^c)$$

and because the visual system observation matrix H is irrelevant to $t_m^n$, the partial derivative of H with respect to $\delta t_m^n$ is zero.

6. The calculation method for visual navigation integrity monitoring as described in claim 1, wherein, the process of analyzing the variation of the fault deviation vector b on a visual observation vector z is as follows:

a linearized visual observation model of the state vector x being expressed as follows:

$$z = Hx + v + b$$

where z is the visual observation vector, and the state vector x is an n-dimensional column vector; v is an m-dimensional observation noise vector subject to Gaussian noise from a zero mean, and its covariance matrix is a diagonal matrix R, expressed as $R = \sigma^2 I_{m*m}$; b is an m-dimensional fault bias vector, under the condition of no fault, b is a zero vector, but when a single fault occurs in the $i^{th}$ measurement quantity, the $i^{th}$ element in b is still expressed as b;

when the visual observation vector varies, the visual observation error $\delta z$ is expressed as: $\delta z = H \delta x$;

therefore, the least square solution of $z = Hx + v + b$ is obtained as:

$$\delta x = (H^T H)^{-1} H^T \delta z$$

if a noise vector is not taken into account, the following equation is obtained from the linear observation model of the state vector x:

$$\delta x = \hat{x} - x = \overline{H} z = \overline{H} b$$

where $\overline{H} = (H^T H)^{-1} H^T$ because the fault deviation vector b has an influence on each component x and y of a pixel point (x, y), the fault deviation vector b is expressed in polar coordinates as: $b_i = \|b\|\cos\theta$, $b_j = \|b\|\sin\theta$; then $b_i = \|b\|\cos\theta$ is the influence of the fault deviation vector b on the component x, $b_j = \|b\|\sin\theta$ is the influence of the fault deviation vector b on the component y; therefore, the norm of the position error is: $\|\delta x\|^2 = (\overline{H}b)^T \overline{H}b$;

because $$(\overline{H}b)^T \overline{H}b = b^T \overline{H}^T \overline{H} b = b_i b_i (\overline{H}^T \overline{H})_{ii} + b_i b_j (\overline{H}^T \overline{H})_{ij} + b_i b_j (\overline{H}^T \overline{H})_{ji} + b_j b_j (\overline{H}^T \overline{H})_{jj}$$

by substituting it into the polar coordinate formula, the influence formula of the fault deviation vector b on a horizontal position error is obtained as follows:

$$\delta x = \left(\|b\|^2 \left(\sin^2\theta(\overline{H}^T\overline{H})_{ii} + \sin 2\theta(\overline{H}^T\overline{H})_{ij} + \cos^2\theta(\overline{H}^T\overline{H})_{jj}\right)\right)^{\frac{1}{2}}$$

therefore, when the angle value θ changes, the horizontal position error will also change correspondingly, especially when some special angle values are taken for θ, the formula of horizontal position error δx is simplified.

7. The calculation method for visual navigation integrity monitoring as described in claim 1, wherein, the process of calculating the combined navigation positioning equation is:
assuming that the satellite positioning equation is z=Gx, and combining the visual system observation matrix H with a satellite observation matrix G to obtain a new combined extended observation matrix H', which is expressed as follows:

$$H' = \begin{bmatrix} H \\ G \end{bmatrix},$$

H' is an m*n linear observation matrix,
when a limited number of satellites are still available, the limited number of satellite observations is utilized to enhance a visual navigation device;
if the visual system is a binocular visual system composed of two cameras or a system composed of three cameras, transformation matrixes $M_1$, $M_2$, and $M_i$ of a single camera sensor in the visual system are combined into M, and M is expressed as:

$$M = \begin{pmatrix} M_1 & 0 & 0 \\ 0 & M_2 & 0 \\ 0 & 0 & M_i \end{pmatrix}$$

8. The calculation method for visual navigation integrity monitoring as described in claim 1, wherein, the calculation method of the protection levels is divided into three hypotheses: a hypothesis 1, a hypothesis 2, and a hypothesis 3; and the hypothesis 1 is the case where there is no fault in the observations; the hypothesis 2 is the case where a single fault occurs in the observations; the hypothesis 3 is the case wherein two faults occur in the observations.

9. The calculation method for visual navigation integrity monitoring as described in claim 8, wherein, in the case of the hypothesis 1, the protection level is calculated according to a fault-free pickup factor $K_{ff}$ and a horizontal position standard deviation $\sigma_x$, wherein the fault-free pickup factor $K_{ff}$ is determined by a fault-free probability $P_{ff}$; therefore, a calculation formula of a fault-free protection level is expressed as:

$$HPL_1 = K_{ff}(k) * \sigma_x$$

where $K_{ff}$ is the fault-free pickup factor, and $\sigma_x$ is the standard deviation in an aircraft horizontal direction;
in the case of the hypothesis 2, it is possible for a single visual observation to fail or a single satellite positioning observation to fail;
when only a single observation fails, only one deviation component is comprised in the fault deviation vector b, and the horizontal position error δx now is expressed as follows:

$$\delta x = \hat{x} - x = \overline{H}z = \overline{H}b$$

where $\hat{x}$ denotes the least square estimation value, $\overline{H} = (H^T H)^{-1} H^T$;
the slope of each observation is set to Hslope, expressed as follows:

$$Hslope_i = \frac{\delta x^2}{D} = \frac{\|\delta x\|^2}{\|p\|^2} = \frac{\delta x^T \delta x}{p^T p} = \frac{b^T \overline{H}^T \overline{H} b}{b^T P^T P b}$$

wherein $b^T \overline{H}^T \overline{H} b = b_i b_i (\overline{H}^T \overline{H})_{ii} + b_i b_j (\overline{H}^T \overline{H})_{ij} + b_i b_j (\overline{H}^T \overline{H})_{ji} + b_j b_j (\overline{H}^T \overline{H})_{jj}$ where D is test statistics, p denotes a parity vector, P denotes a parity transformation matrix, p=Pb; therefore, the horizontal positioning error protection level $HPL_2$ is:

$$HPL_2 = Hslope_{max} \times s_{bias}$$

$$s_{bias} = \frac{\sigma \sqrt{\lambda}}{\sqrt{n-4}},$$

where σ is a noise variance, λ is a decentralized parameter, and the value of $HPL_2$ is minimum when there is no fault, and when a single fault occurs in the observations, the value of $HPL_2$ will increase;
in the case of the hypothesis 3, it is possible for two visual observations to fail, two satellite positioning observations to fail or one visual observation and one satellite positioning observation to fail;
when two observations fail, fault deviation vectors of simultaneous failing of the $i^{th}$ observation and the $j^{th}$ observation are $b^{(i)}$ and $b^{(j)}$, which is expressed as:

$$b = [0 \ldots 0 \ b^{(i)} \ b^{(j)} 0 \ldots 0 \ 0 \ldots 0]^T$$

therefore, the positioning error is expressed as follows:

$$\Delta = \overline{H} b = Ab = [b^{(i)} A_{1i} + b^{(j)} A_{1j} \ b^{(i)} A_{2i} + b^{(j)} A_{2j} \ b^{(i)} A_{3i} + b^{(j)} A_{3i} \ b^{(i)} A_{4i} + b^{(j)} A_{4j}]^T$$

the horizontal positioning error is expressed as follows:

$$\delta x^2 = (b^{(i)} A_{1i} + b^{(j)} A_{1j})^2 + (b^{(i)} A_{2i} + b^{(j)} A_{2j})^2$$

therefore, the formula for calculating the slope Hslope is:

$$Hslope_i = \frac{\delta x^2}{D} = \frac{\|\delta x\|^2}{\|p\|^2} = \frac{\delta x^T \delta x}{p^T p} = \frac{(b^{(i)} A_{1i} + b^{(j)} A_{1j})^2 + (b^{(i)} A_{2i} + b^{(j)} A_{2j})^2}{b^T P^T P b}$$

therefore, the formula for calculating $HPL_3$ is:

$$HPL_3 = Hslope_{max} \times s_{bias}$$

by combining the hypothesis 1, the hypothesis 2, and the hypothesis 3, errors in all cases are enveloped in the protection levels, and a formula for calculating a total protection level is obtained as follows:

$$HPL = \sqrt{\max(HPL_1, HPL_2)^2 + HPL_3^2}.$$

* * * * *